United States Patent [19]

Katayama

[11] 4,179,899
[45] Dec. 25, 1979

[54] REFRIGERATING SYSTEM
[75] Inventor: Naohiro Katayama, Tokyo, Japan
[73] Assignee: Sawafuji Electric Co. Ltd., Tokyo, Japan
[21] Appl. No.: 916,066
[22] Filed: Jun. 16, 1978
[30] Foreign Application Priority Data Jun. 24, 1977 [JP] Japan .................................. 52-75142
Feb. 15, 1978 [JP] Japan .................................. 53-16069
Feb. 15, 1978 [JP] Japan .................................. 53-16070

[51] Int. Cl.² ......................... F25B 31/02; F04B 49/10
[52] U.S. Cl. ...................................... 62/228; 318/473; 361/22; 417/32
[58] Field of Search ................. 62/228 B, 228 R, 230; 361/22; 417/326, 32; 323/22 T; 318/473

[56] References Cited
U.S. PATENT DOCUMENTS 3,781,140 12/1973 Gladden ................................ 417/326

Primary Examiner—William E. Wayner

[57] ABSTRACT

A refrigerating system having a compressor; an inverter connected to the compressor for supplying electric energy to the compressor; and an input voltage control circuit provided on the input side of the inverter, wherein the input voltage control circuit generates output voltage signals which change at a predetermined level, including zero level, within a certain temperature range in response to the ambient temperature of the refrigerating system and in accordance with the temperature condition, the voltage thus produced being fed to the compressor via the inverter. The refrigerating system of this invention is, therefore, protected from failure or damage even when placed in an extreme temperature environment, and resumes automatically the supply of power to the compressor when the ambient temperature of the system is restored to the normal temperature.

13 Claims, 20 Drawing Figures

TIME L

TIME Ec

TIME Z

TIME V₁

TIME I_L

TIME I_L

REFRIGERATING SYSTEM

BACKGROUND OF THE INVENTION

1. Field of the Invention

This invention relates generally to a refrigerating system having an electric-powered compressor, and more specifically to a refrigerating system which is designed to prevent failure or damage due to unwanted changes of compression level caused by the drop or rise of the ambient temperature of the refrigerating system.

2. Description of the Prior Art

In general, a refrigerating system comprises a compressor driven by electric energy, a condenser to which refrigerant compressed by the compressor is fed, a capillary tube provided on the downstream side of the condenser, an evaporator provided on the downstream side of the capillary tube, the refrigerant evaporated in the evaporator being compressed again in the compressor.

Particularly, when the compressor is a compressor of the electrical vibration type, the vibrating strokes of the electrical vibration type compressor often increase unwantedly as the ambient temperature of the refrigerating system lowers, leading to damages of the valve chest. Refrigerating systems of the abovementioned type are often used for refrigerators on board leisure vehicles (such as camping cars). When such a leisure vehicle is parked near the skiiing ground, the aforementioned phenomenon often occurs as the atmospheric temperature drops. That is, while the refrigerator on board the leisure vehicle is operated at the room temperature in the vehicle, the condenser connected to the compressor of the refrigerator, which is exposed to the outdoor temperature, is cooled to as low as −30° C., in extreme cases. As a result, most of the refrigerant is stored in liquefied state in the condenser, and trickles down in small quantities to the evaporator where the refrigerant is, immediately after adiabatically expanded, fed to the condenser by the compressor. This brings the gas pressure in the evaporator and the compressor to almost a vacuum, causing the vibrating stroke of the electrical vibration type compressor to increase unwantedly to such an extent that the valve chest is eventually damaged.

Needless to say, the electrical vibration type compressor is designed to maintain the natural vibration cycle, or frequency, of the mechanical vibration system, which is determined by the coefficient of elasticity of the refrigerant gas and the spring constant of the mechanical vibration system, and the vibration cycle, or frequency of the electrical vibration system for driving the mechanical vibration system at a resonating state, whereever possible. Particularly, the refrigerating system constructed so as to properly maintain the resonance by changing the vibration cycle of the electrical vibration system in accordance with changes in the natural vibration cycle of the mechanical vibration system is directly and sensitively, affected by the aforementioned increase in the vibration stroke because, even when the natural vibration cycle of the mechanical vibration system is changed due to decreases gas pressure of the refrigerant, the vibration cycle of the electrical vibration system, or the vibrating frequency of alternating voltage, is changed in accordance with the change of the natural vibration cycle to maintain the resonance. It was also found that, when a refrigerating system of this type is driven at an elevated ambient temperature, the windings of the compressor tend to be burned out unwantedly.

SUMMARY OF THE INVENTION

It is a principal object of this invention, therefore, to provide a refrigerating system designed to prevent the occurrence of failures due to the unwanted change of compression level resulting from a drop in the refrigerant gas pressure because of a drop in the ambient temperature of the refrigerating system by decreasing electric energy to be supplied to the compressor.

It is another object of this invention to provide a refrigerating system designed to prevent the unwanted burning of the windings of the compressor at increased ambient temperature of the refrigerating system.

It is still another object of this invention to provide a refrigerating system designed to prevent unwanted damages to the valve chest at extremely low temperature and to automatically check the ambient temperature periodically so that the supply of power to the compressor is automatically resumed when the ambient temperature is restored to normal.

It is a further object of this invention to provide a refrigerating system having a compressor and an inverter comprising at least two semiconductor elements with control portions which are alternately turning on and off to have a output current of a level proportional to the control current level to be supplied to the control portion, wherein the control current is controlled in response to the ambient temperature of the refrigerating system to prevent unwanted damage to the compressor when the refrigerating system is exposed to extremely low temperature.

It is a further object of this invention to provide a refrigerating system having an inverter which has a output current of a level corresponding to the level of the control current to be supplied to the control portion, wherein the output level of the inverter is decreased with a drop in the ambient temperature of the refrigerating system and the compressor is prevented from the unwanted damage by reducing the output voltage of the inverter, that is, the input voltage of the compressor to zero by maintaining the control current level at zero level when the refrigerating system is exposed to low temperature, and the supply of electric power is automatically resumed when the ambient temperature of the refrigerating system is restored to normal.

DESCRIPTION OF THE PREFERRED EMBODIMENTS

Figure 1:
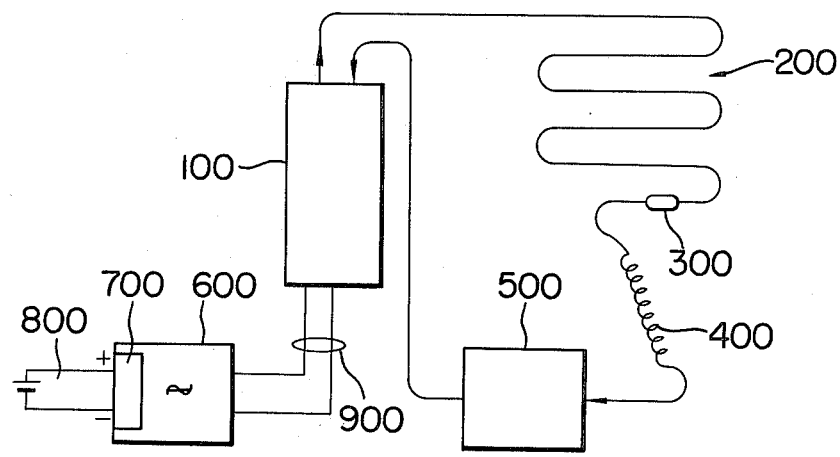
FIG. 1 is a schematic diagram illustrating a refrigerating system embodying this invention.

In FIG. 1 showing a refrigerating system embodying this invention, numeral 100 refers to an electrical vibration type compressor, 200 to a condenser, 300 to a strainer comprising a filter, 400 to a capillary tube, 500 to an evaporator, 600 to an inverter, 700 to an input voltage control circuit, 800 to a d-c power supply, or a battery on board an automobile (or the power supply thereof), and 900 to lead wires, respectively.

In leisure vehicles, for example, the commercial power source is rectified to operate various electrical equipment on board the car and drive the compressor 100 via the inverter 600 while charging the battery 800 in an area where such a commercial power source is available. In an area where the commercial power source is not available, electrical equipment on board the car and the compressor 100 are driven by the battery 800. Furthermore, during travelling on the road, the battery 800 is float charged by a generator on board the car, and drives the compressor 100 by causing the inverter 600 to generate alternating voltage. The construction and operation of the input voltage control circuit 700 will be described later, referring to FIG. 7 and the subsequent figures, and the construction and operation of the compressor 100 and the inverter 600 will be described, referring to FIGS. 3 through 6.

The compressor 100 compresses refrigerant gas to supply to the condenser 200 where the refrigerant gas is cooled by the outside air and partially liquefied. The refrigerant is passed through the strainer 300 and the capillary tube 400, and adiabatically expanded in the evaporator 500. And then the refrigerant is returned to the compressor 100 for compression.

Refrigerating system of the aforementioned type are widely used in refrigerators on board various leisure vehicles, as described above. However, when such a leisure vehicle is parked in an area where the outdoor temperature is extremely low, the valve chest of the compressor 100 is often damaged mainly for the following reasons.

(1) Because of an extremely low outdoor temperature, most of the refrigerant stays in the condenser 200 in the liquefied state while a state close to a vacuum develops in the evaporator 500 and the compressor 100.

(2) In the case of a compressor and its drive unit as will be described later in FIGS. 3 through 6, a resonance between the mechanical vibration system and the electrical vibration system is faithfully maintained even in the state described in (1) although the use of compressor of this type under an extremely low temperature condition is not taken into consideration.

Figure 2:
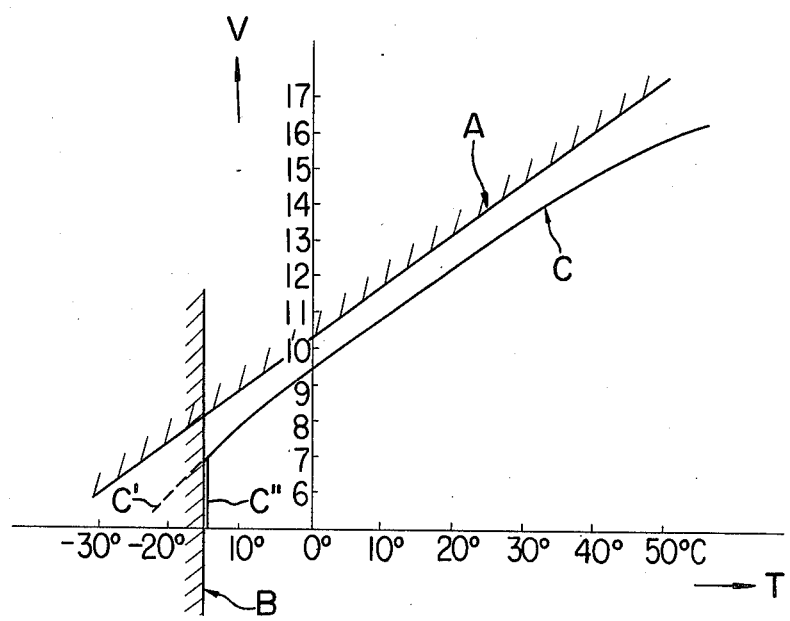
FIG. 2 is a chart illustrating the limit of electric energy to be supplied to the refrigerating system in response to the ambient temperature of the refrigerating system.

FIG. 2 is a chart illustrating an example of the limit of a voltage to be applied to the inverter 600 lest the valve chest should be damaged even in long hours of driving. In the figure, the abscissa represents the outdoor temperature, particularly the ambient temperature of the condenser 200, and the ordinate represents the voltage applied to the inverter 600. The line A represents an example of the ambient temperature/critical input voltage characteristic, and the line B represents an example of the critical ambient temperature characteristic. Based on this figure, the voltage to be applied to the inverter 600 in the embodiments to be described later is given a characteristic as shown by a curve C (solid line), for example, by the input voltage control circuit 700 shown in FIG. 1 so that the compressor 100 can be properly operated within a range not exceeding the abovementioned characteristic lines A and B. To begin with, an electrical vibration type compressor used in this invention and its driving principle will be described in what follows, referring to FIGS. 3 through 6.

Figure 3:
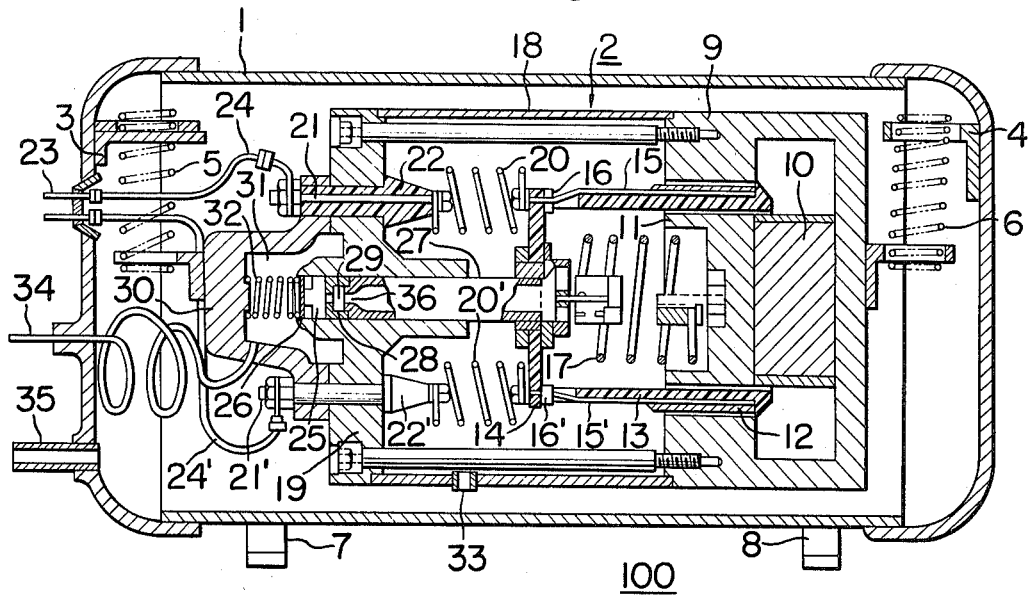
FIG. 3 is a cross section of an electrical vibration type compressor of this invention.

FIG. 3 is a cross section of an electrical vibration type compressor used in this invention. In FIG. 3, numeral 1 refers to an enclosed cylindrical housing having a compressor proper 2 suspended by arms 3 and 4 and coil springs 5 and 6, and mounting legs 7 and 8. The compressor proper 2 comprises, at least, a yoke 9 having the shape of a bottomed cylinder, a columnar permanent magnet 10 fitted to the inner bottom surface of the yoke 9, a cup-shaped magnetic pole 11 fitted to the opposite end face (the left end face in the figure) of the permanent magnet 10, a cylindrical driving coil 12 loosely fitted in the annular space between the outer surface of the magnetic pole 11 and the inner surface of the yoke 9, a disc-shaped support plate 14 supporting the driving coil 12 by the aid of a plurality of supporting members 13, conductor plates 15 and 15' serving as electrical conductors of the driving coil 12, insulators 16 and 16' electrically insulating the support plate 14 from the conductor plates 15 and 15', a resonance coil spring 17 interposed between the concave of the cup-shaped magnetic pole 11 and the support plate 14, a cylindrical spacer casing 18 disposed concentrically with the yoke 9, a cylinder 19 disposed at an end of the spacer casing 18, conductor springs 20 and 20', terminal screws 21 and 21', insulators 22 and 22' insulating the terminal screws 21 and 21' from the cylinder 19, lead wires 24 and 24' connecting the terminal screws 21 and 21' with terminals 23 on the housing 1, a valve chest 25 provided on the left end (in the figure) of the cylinder 19, a valve plate 26, a piston 27, a valve chest 28, a valve plate 29, a cap-shaped head cover 30 covering the valve chest 25, and a valve chest 31 formed between the valve plate 26 and the head cover 30, and a coil spring 32 disposed in the valve chest 31 in its loaded (or compressed) state. A refrigerant passage 33 is provided in the lower part (in the figure) of the spacer casing 18 to afford communication between the inside and outside of the spacer casing 18. A refrigerant outlet tube 34 is provided to the head cover to connect the valve chest 31 of the head cover 30 and the outside of the enclosed cylindrical housing 1 of the compressor. The refrigerant is introduced from the outside of the compressor to the inside of the housing 1 through a refrigerant inlet tube 35.

A passage 36 is provided on the left end (in the figure) of the hollow piston 27 to afford communication between the inside of the hollow piston 27 and the valve chest 25 through the valve plate 29.

The piston 27 reciprocates as the driving coil 12 vibrates in a manner as described more fully below, and refrigerant gas enters the housing 1 through the refrigerant inlet tube 35 and then flows into the spacer casing 18 via the passage 33. The refrigerant is discharged from the refrigerant outlet tube 34 via the hollow part of the piston 27, the valve chest 28, the valve chest 25 and the valve chest 31.

The mechanical vibration system consists essentially of the driving coil 12, the piston 27 and members connecting them, the coil spring 17 and the elastic coefficient of the refrigerant. The mechanical vibration system has a natural vibration cycle dependent on the operating conditions of the mechanical vibration system, and is adapted to resonate with the drive current as will be described later.

Figure 4A:
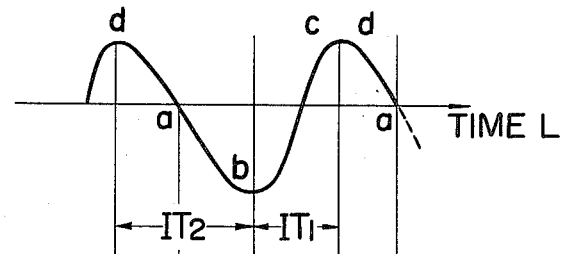
FIGS. 4a-4f are a group of waveform charts illustrating the operation of the electrical vibration system of the electrical vibration type compressor shown in FIG. 3.
Figure 4B:
Figure 4C:
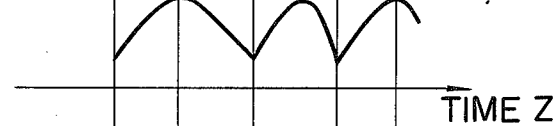

In the following, the operation of the mechanical vibration system will be described in detail. FIG. 4(A) shows the vibration of the mechanical vibration system. The counter electromotive force induced in the driving coil 12 in accordance with the vibration of the mechanical vibration system assumes a waveform shown in FIG. 4(B) with respect to the amplitude change, being zero at the top and bottom dead center points of the driving coil 12. Since there is a difference in time between the compression stroke IT1 and the suction stroke IT2, the waveform of the counter electromotive force does not assume a perfect sinusoidal waveform, but a somewhat distorted waveform. Consequently, the waveform of the impedance Z of the electrical vibration type comnpressor, which changes with time, assumes a waveform obtained by superimposing the counter e.m.f. waveform as shown in FIG. 4(B) on the basic waveform. The impedance Z is minimum at zero counter e.m.f. and maximum at the maximum counter e.m.f., as illustrated in FIG. 4(C).

Figure 4D:
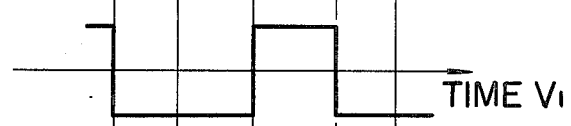
Figure 4E:
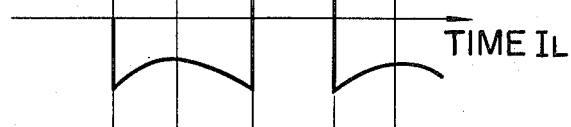

Assume that a square waveform voltage V1 shown in FIG. 4(D), which is in phase with the counter electromotive force $E_c$ as in FIG. 4(B) is applied to the compressor. Then, a current $I_L$ flowing in the driving coil 12 becomes maximum at the minimum value of impedance and minimum at the maximum valve of impedance, as shown in FIG. 4(E), being in phase with V1.

Figure 4F:
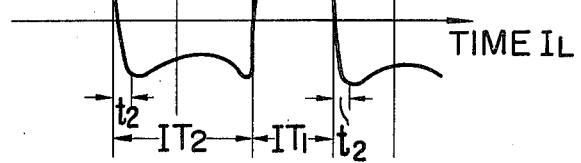

The actual current, however, does not rise vertically, but assumes a curve which lags by a time t1 during the compression stroke and by a time t2 during the suction stroke due to the reactance of the compressor, including the driving power circuit, as shown in FIG. 4(F).

It follows from the above description that, in order to operate the electrical vibration type compressor at its maximum efficiency, it is necessary to apply an alternating voltage as shown in FIG. 4(D) and to cause the alternating voltage to coincide with the vibration cycle of the electrical vibration type compressor.

To achieve this, the inverter 600 is operated to convert a d-c power source voltage into an alternating voltage which coincides with the amplitude of the electrical vibration type compressor. That is, a plurality of semiconductor elements are used to convert the d-c power source voltage into an alternating square wave. The semiconductor elements turn on and off the d-c power source voltage to produce an alternating voltage having the abovementioned vibration cycle.

Figure 5:
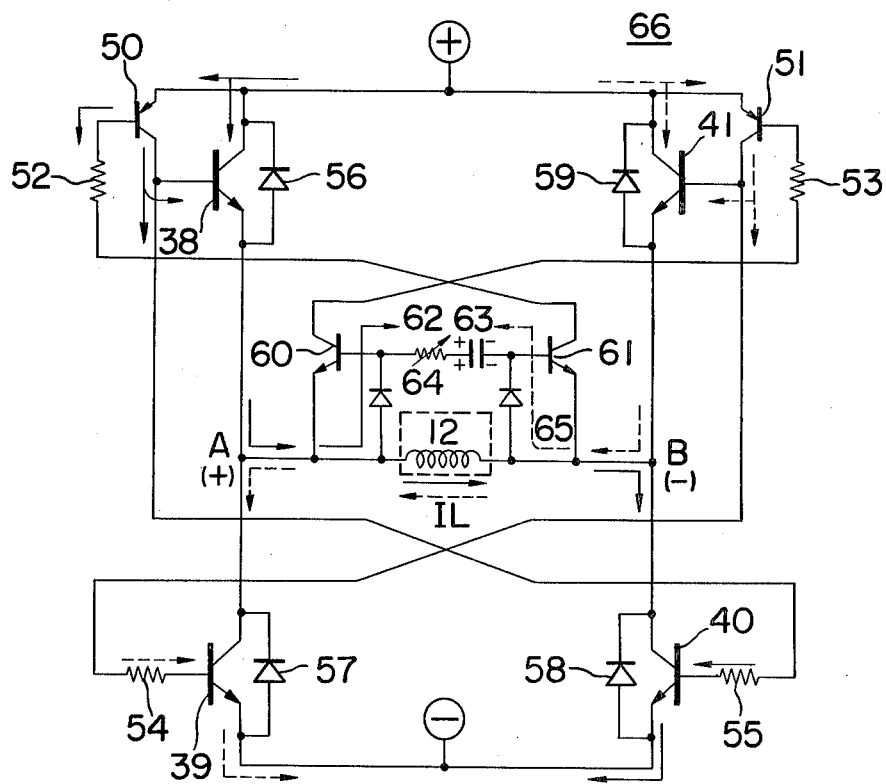
FIG. 5 is a circuit diagram of an inverter embodying this invention for driving the electrical vibration type compressor shown in FIG.3.

FIG. 5 shows an example of the d-c/a-c inverter portion of the inverter 600, and (A), (B), (C) and (D) of FIG. 6 illustrate its operation.

In FIG. 5, numeral 12 refers to the same driving coil as shown in FIG. 3; 38 through 41 to main switching elements, for example, transistors which are bridge-connected with each other, two pairs of the transistors 38 and 40 and the transistors 39 and 41 repeating on-off operation alternately. Numerals 50 and 51 refer to transistors for supplying currents to the bases each of the transistors 38 and 40 and the transistors 39 and 41; 52 and 53 to resistors for controlling the collector currents of the transistors 61 and 60, that is, the base currents of the transistors 50 and 51; 54 and 55 to resistors for controlling the base currents of the transistors 39 and 40; and 56 through 59 to diodes for preventing the reversed connection of the d-c power supply and forming a discharge circuit of a capacitor 63, as will be described later. Numerals 60 and 61 refer to detecting switching elements, for example, transistors, for detecting the charging for discharging current of the capacitor 63 and controlling the main switching elements 38 through 41, as will be described later. Numeral 62 refers to a variable resistor for controlling the charging or discharging current of the capacitor 63; 63 to a capacitor connected in parallel with the driving coil 12 via the detecting switching elements 60 and 61; 64 and 65 to diodes forming a charging path for the capacitor 63. Furthermore, the detecting switching elements 60 and 61, the capacitor 63, the resistor 62, the diodes 64 and 65 form a detecting means.

Now, assume that the d-c power source is turned on in the polarity as shown in the figure, and the circuit is put into the steady operation and switched to a state where the terminal A is $\oplus$ and the terminal B is $\ominus$. Then, a current flows in the direction of the arrow with a solid line as shown in the figure through the diode 64 and the variable resistor 62 to charge the capacitor 63. This charge current supplies the transistor 61 with a base current to turn on the transistor 61, with the consequence that the transistor 50 is turned on. A drive current is supplied to the driving coil 12 due to the transistors 38 and 40 turned on. The current flow in the circuit is in the direction of the arrow with a solid line as shown in the figure.

Figure 6A:
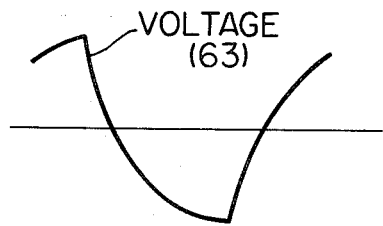
FIG. 6 is a group of waveform charts illustrating the operation of the inverter shown in FIG. 5.
Figure 6B:
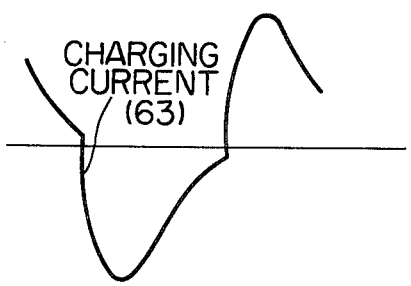
Figure 6C:
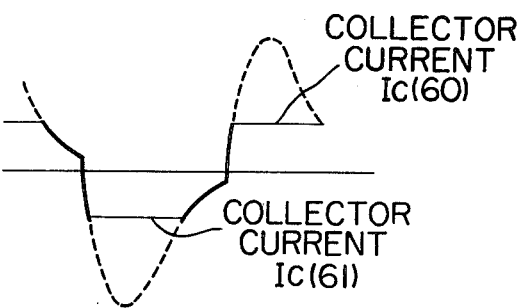

The charge voltage in the capacitor 63 is as shown in FIG. 6(A) and the charge current is as shown in FIG. 6(B). That is, a charge current is supplied to the capacitor 63 in accordance with the time constant determined by the circuit resistance (the resistance value of the variable resistor 62 and other circuit elements) and the capacitance value of the capacitor 63 as the main switching elements 38 and 40 are switched from the OFF state to the ON state. However, the charge current tends to diminish as the charge voltage approaches the voltage between the terminals A and B. Since this charge current is to supply the detecting switching element 61 with a base current $I_{B(61)}$, the collector current $I_{C(61)}$ of the detecting switching element 61 is to be as indicated by the broken line in FIG. 6(C). The actual collector current $I_{C(61)}$, however, is as indicated by the solid line in FIG. 6(C) because the collector current $I_{C(61)}$ is limited by the resistor 52.

The main switching element 38 remains in the saturated region as long as its collector current $I_{C(38)}$ satisfies the following equation.

$$I_{C(38)} \leq I_{B(38)} \times h_{FE(38)}$$

And, the main switching element 38 enters the active region when the collector current $I_{C(38)}$, that is, the drive current $I_L$ is $$I_{C(38)} = I_L \geq I_{B(38)} \times h_{FE(38)}.$$

In this way, when the main switching element 38 enters the active region, the capacitor 63 begins discharging because the voltage drop between the collector and emitter of the main switching element 38 increases and the voltage of the terminal A drops. The base current $I_{B(38)}$ of the main switching element 38 is proportional to the collector current $I_{C(61)}$ of the switching element 61. Because of the inductance of the driving coil 12, this discharge circuit is mainly composed of the capacitor 63, the variable resistor 62, the transistor 60, the diode 56, the main switching element 41, and the diode 65, or the capacitor 63, the variable resistor 62, the transistor 60, the main switching element 39, the diode 58 and the diode 65. Since this discharge current supplies the transistor 60 with a base current, the transistor 60 is turned on, and at the same time, the main switching elements 39 and 41 are also turned on. Furthermore, since the discharge current brings the already turned-off transistor 61 more strongly to the OFF state, the main switching elements 38 and 40 are strongly turned off simultaneously with the switching. Consequently, the drive current $I_L$ flows in the direction of the broken line shown in the figure, contrary to the state where the main switching elements 38 and 40 are in the ON state.

Figure 6D:
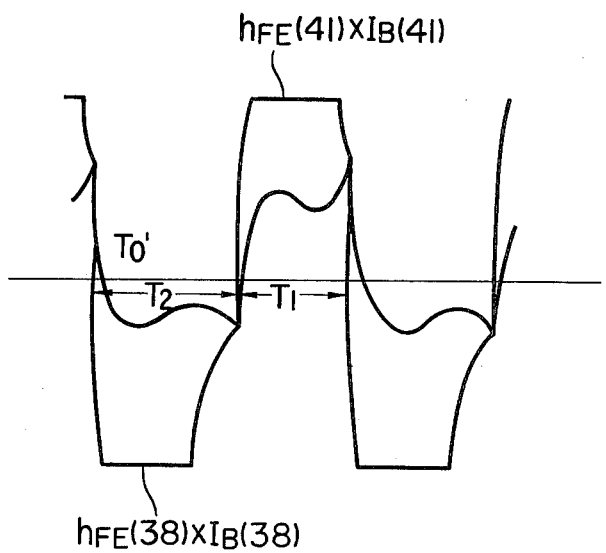

The subsequent operation until the main switching elements 39 and 41 are turned off is the same as in the state where the main switching elements 38 and 40 are in the ON state because the circuit configuration is symmetrical. However, the conduction period of the pair of the main switching elements 38 and 40 differs from that of the pair of the main switching elements 39 and 41, depending on the time T1 of the compression stroke and the time T2 of the suction stroke as shown in FIG. 4. This can be explained as follows. Since one detecting means (the diode 64, the resistor 62, the capacitor 63 and the detecting switching element 61) is symmetrical with respect to the other detecting means (the diode 65, the capacitor 63, the resistor 62 and the detecting switching element 60), the waveform $h_{FE(38)} \times I_{B(38)}$ and the waveform $h_{FE(41)} \times I_{B(41)}$ shown in FIG. 6(D) are symmetrical, though opposite in polarity, while the positive half of the drive current $I_L$ (that is, the collector currents $I_{C(38)}$ and $I_{C(41)}$ is not symmetrical with respect to its negative half, as shown in FIG. 4(F).

As a result, the point of time at which the abovementioned switching condition $$I_C \geq I_B \times h_{FE}$$

is satisfied differs between the positive half and the negative half, and becomes in agreement with the desired time IT1 of the compression stroke and the desired time IT2 of the suction stroke, and controlled in such a manner.

The electrical vibration type compressor as described above is operated so that the vibration cycle of the mechanical vibration system and that of the electrical vibration system are properly maintained in resonance at all times. For this reason, even when an event described in connection with FIG. 1 occurs, causing the vibration cycle of the mechanical vibration system to change, an alternating voltage is supplied to compensate such a change so as to maintain the stroke of the piston at its maximum. This causes the stroke of the piston to increase unwantedly if the refrigerant gas pressure drops, as described above.

Figure 7:
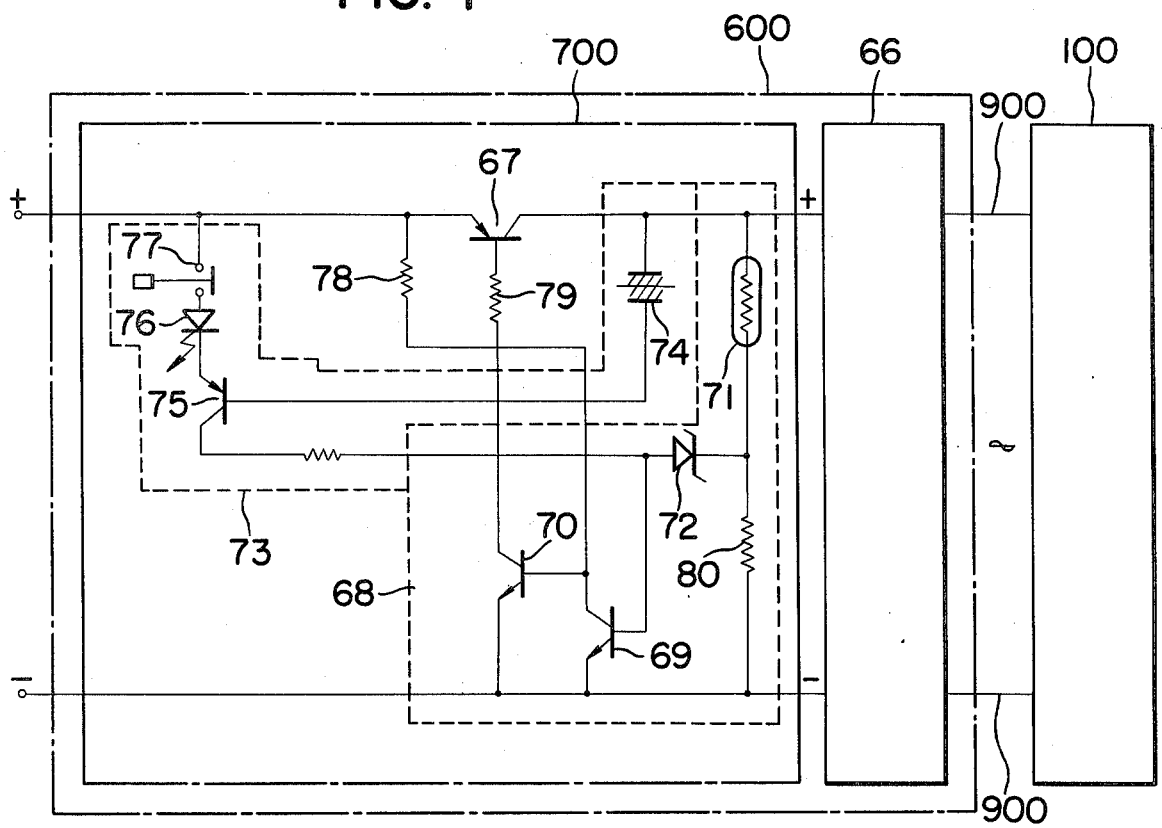
FIG. 7 is a circuit diagram of an input voltage control circuit embodying this invention.

FIG. 7 shows an input voltage control circuit embodying this invention. In the figure, numerals 100, 600, 700 and 900 correspond with like numerals in FIG. 1. Numeral 66 refers to a d-c/a-c inverter portion, corresponding to the circuit shown in FIG. 5; 67 to a switching element; 68 to a control circuit stage; 69 and 70 to transistors, 71 to a positive characteristic thermistor, 72 to a zener diode; 73 to a detection circuit for reverse connection and shortcircuit; 74 to a bidirectional diode for supervising the voltage between the emitter and collector of the switching element 67, 75 to a transistor; 76 to a light emitting diode; 77 to a reset switch; 78, 79 and 80 to resistors, respectively.

The input voltage control circuit 700 shown in FIG. 7 may be regarded as constructed so as to generate output voltage in accordance with the curves C and C' shown in FIG. 2. That is, the positive characteristic thermistor 71 is disposed in the vicinity of the condenser 200 shown in FIG. 1 so that the resistance value of the thermistor 71 varies with the ambient temperature of the condenser 200. At the ambient temperature drops, the resistance value of the thermistor 71 decreases with the consequence that the collector current of the transistor 69 increases while the collector current of the transistor 70 decreases, causing the voltage drop of the switching element 67 to increase and the output voltage to decrease. That is, an output voltage in accordance with the curves C and C' shown in FIG. 2 is produced. Thus, even when the compressor 100 is operated in the resonance state, the stroke of the piston 27 in the compressor 100 is decreased, preventing unwanted damage to the valve chest.

The voltage between the emitter and collector of the switching element 67 is supervised by the bidirectional diode 74 via a series circuit consisting of the normally-on reset switch 77, the light emitting diode 76, the transistor 75 and the bidirectional diode 74. If the d-c/a-c inverter portion 66 is reversely connected by mistake, or if the d-c/a-c inverter portion 66 is short-circuited, the bidirectional diode 74 breaks over, thus turning on the transistor 75, causing the light emitting diode 76 to light up, and forcing the transistor 69 to operate in the saturated state, with the consequence that the transistor 67 is switched to the OFF state. In order to release the OFF state, the reset switch 77 is temporarily turned off.

When a refrigerator on board a leisure vehicle is operated by a battery power source 800 (FIG. 1), the voltage of the battery 800 generally fluctuates within a range of a few volts. When operating the refrigerator by a power source with large voltage variations, the voltage drop by the switching element 67 is desired to be as low as possible under normal operating condition. When the switching element 67 is constructed of transistors, therefore, it is desired to connect the emitter side of the switching element 67 to the battery power source 800. In general, when the collector side of the switching element 67 is connected to the battery power source 800, the voltage between the emitter and collector of the switching element 67 tends to increase. This makes an efficient operation difficult under the abovementioned voltage fluctuation.

Figure 8:
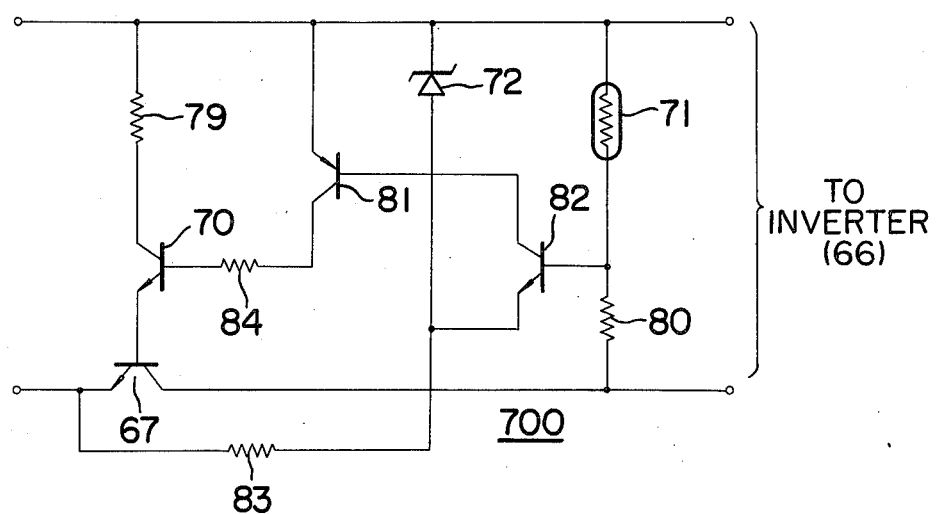
FIG. 8 is a circuit diagram illustrating the input voltage control circuit showing another modification.

FIG. 8 shows another modification of the input voltage control circuit. In the figure, numerals 67, 70, 71, 72, 79 and 80 correspond to like numerals in FIG. 7. Numerals 81 and 82 designate transistors, and 83 and 84 resistors, respectively. In the figure, the thermistor 71 is a negative characteristic thermistor, and the operation of which is essentially the same as that shown in FIG. 7.

Figure 9:
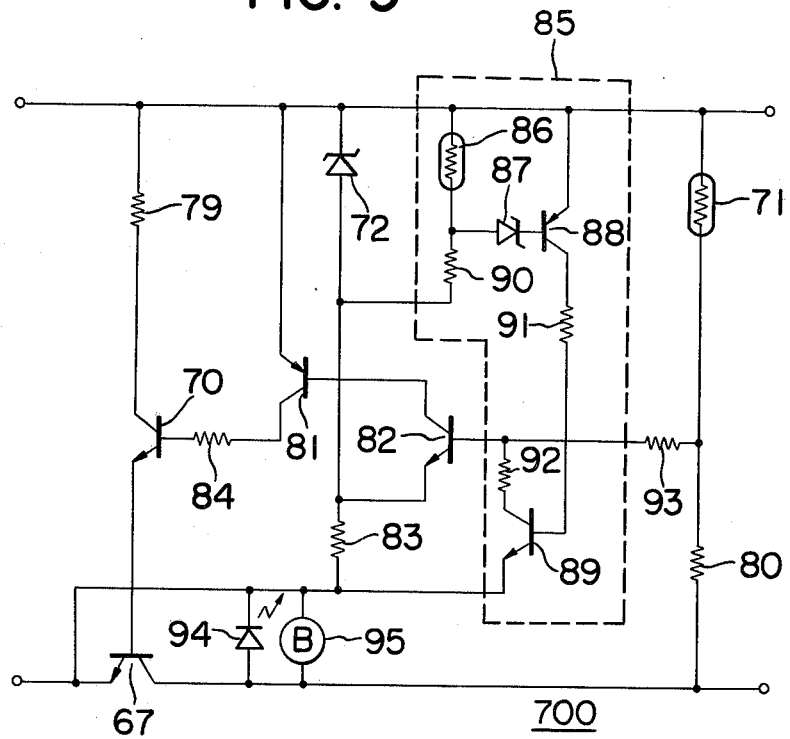
FIG. 9 is a circuit diagram of the input voltage control circuit constructed so as to respond to extremely low ambient temperatures, showing still another modification.

FIG. 9 shows still another modification of the input voltage control circuit. In the figure, numerals 67, 70, 71, 72, 79, 80, 81, 82, 83 and 84 correspond to like numerals in FIG. 8. Numeral 85 designates a cut-off characteristic circuit portion; 86 a negative characteristic thermistor; 87 a zener diode; 88 and 89 transistors; 90 through 93 resistors; 94 a light emitting diode; 95 a buzzer, respectively. Circuits and their operations except for the cut-off characteristic circuit portion 85 are the same as those in FIG. 8. That is, an output voltage corresponding to the characteristic curve C shown in FIG. 2 is generated in accordance with changes in the resistance of the thermistor 71. At the same time, when the thermistor 86 detects that the ambient temperature reaches $-15°$ C. as shown in FIG. 2, for example, the transistors 88 and 89 are turned off, and the transistors 82, 81 and 70 are forcibly brought to the OFF state, causing the switching element 67 to turn off. As the switching element 67 is turned off, the light emitting diode 94 lights up and the buzzer 95 sounds to issue an alarm. That is, a control function in accordance with the cut-off characteristic C″ shown in FIG. 2 is effected.

In this way, the aforementioned embodiments makes it possible to prevent damages to valve chests, as described earlier, referring to FIG. 1, in a refrigerating system, for example, a refrigerator on board a leisure vehicle, even when the ambient temperature lowers unexpectedly.

Figure 10:
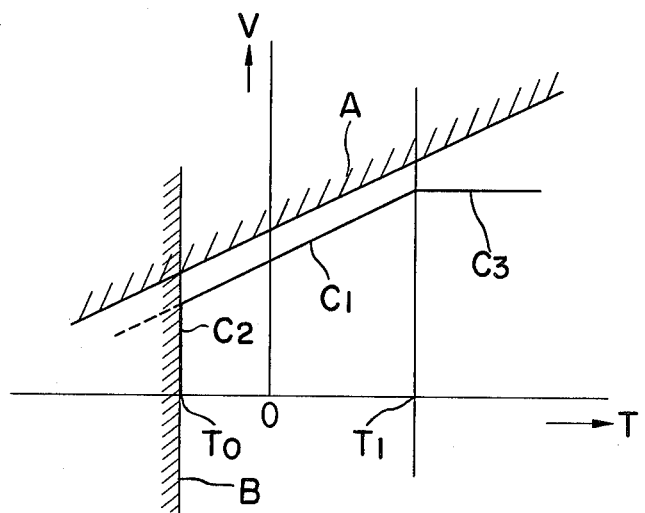
FIG. 10 is a chart illustrating the characteristics of electric energy to be supplied to the refrigerating system in response to the ambient temperature of the refrigerating system, in which limits are established both on the low temperature side and the high temperature side.

FIG. 10 and the subsequent figures correspond to other embodiments of this invention. The characteristic shown in FIG. 10 is that of the electric energy to be supplied to the refrigerating system in response to the ambient temperature as in FIG. 2. The characteristic in FIG. 10 differs from that in FIG. 2 in that a limit value is provided not only on the low temperature side but on the high temperature side to maintain the input voltage at a constant value when the temperature exceeds this limit. Symbols A, B, C, V and T in FIG. 10 correspond to those in FIG. 2. In the figure, a temperature To represents the lower limit ambient temperature below which the vibration stroke of the compressor sharply increases, causing unwanted damage to the valve chest while a temperature T1 represents the upper limit ambient temperature. A control function in accordance with the characteristic shown in FIG. 10 is effected (1) by giving a characteristic so that the input voltage increases in proportion to a temperature rise as shown by the line C1 in the figure when the ambient temperature is above the temperature To in the figure and below the temperature T1, (2) by maintaining the input voltage at zero, that is, discontinuing the supply of electric energy, as shown by the line C2 when the ambient temperature is lower than the temperature To, and (3) by maintaining the input voltage at a predetermined level as shown by the line C3 in the figure when the ambient temperature exceeds the temperature T1. Furthermore, provision is made to automatically recover the input voltage in the state (2) by periodically checking the ambient temperature. Thus, when the ambient temperature is extremely low, the supply of electric energy to the compressor is interrupted to prevent unwanted damage to the valve chests; and when the ambient temperature is high, the input voltage to the compressor is maintained at the predetermined level to prevent the unwanted burning of the driving coil.

Figure 11:
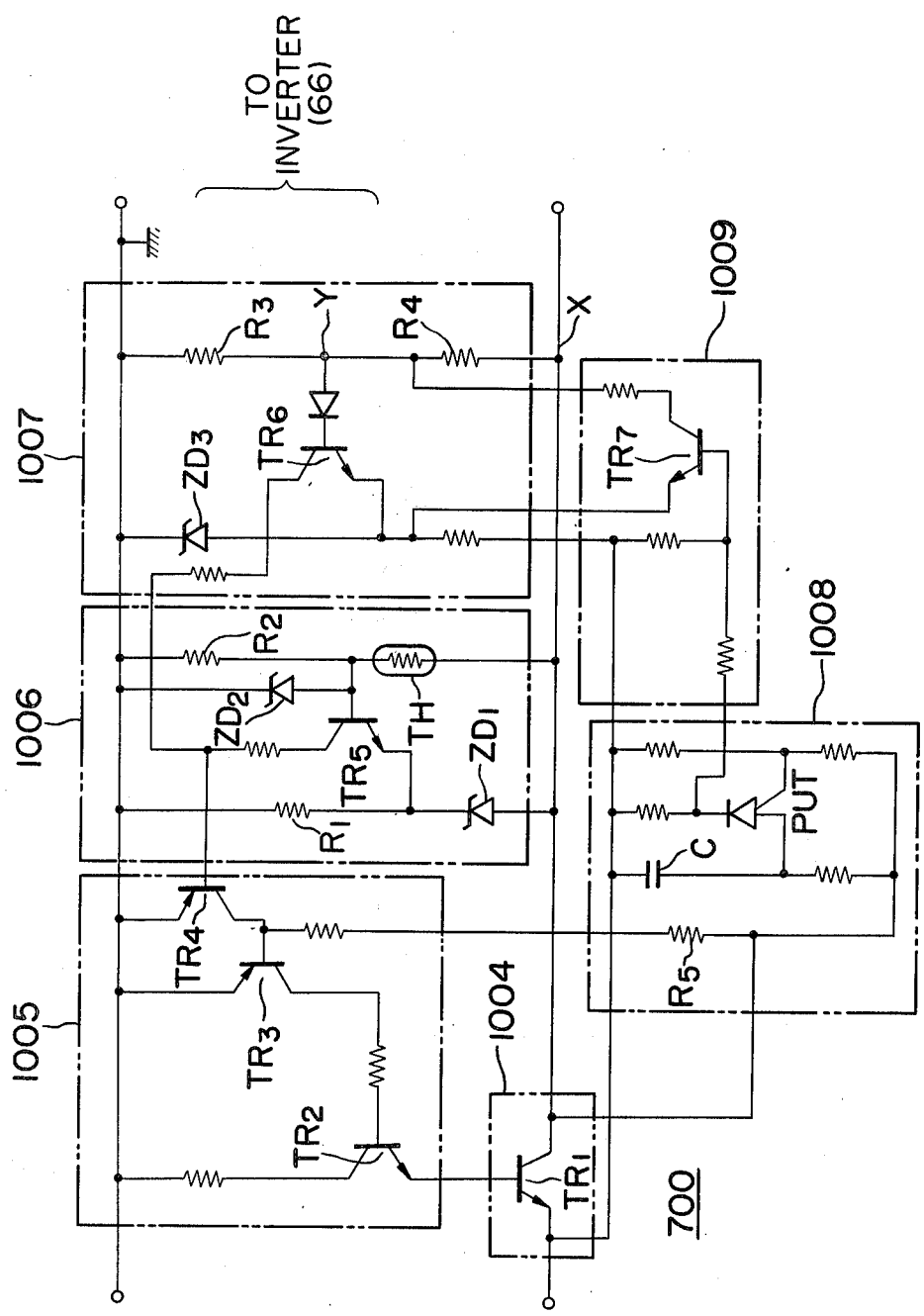
FIG. 11 is a detailed circuit diagram of the input voltage control circuit portion embodying this invention.

FIG. 11 shows a modification of the input voltage control circuit 700 controlling the input voltage in accordance with the characteristic shown in FIG. 10. In the figure, numeral 1004 refers to a switching element, for example a transistor TR1, for controlling the supply of electric power to the inverter 66 (FIG. 7); 1005 to a control circuit for controlling the switching element 1004; 1006 to a temperature detecting circuit for detecting the ambient temperature and controlling the control circuit 1005 in accordance with the detected result; 1007 to a voltage detecting circuit for detecting the input voltage level of the inverter 66 and controlling the control circuit 1005 in accordance with the detected result; 1008 to an OFF-state detecting circuit for detecting the switchover of the switching element 1004 from the ON state to the OFF state; 1009 to a reset circuit for controlling the voltage detecting circuit 1007 in accordance with the detection signal from the OFF-state detecting circuit 1008, respectively.

In FIG. 11, a thermistor TH in the temperature detecting circuit 1006 is a negative characteristic thermistor whose resistance varies in accordance with the ambient temperature. A zener diode ZD2 in the temperature detecting circuit 1006 is turned off when the ambient temperature is lower than the temperature T1 shown in FIG. 10, and turned on when the ambient temperature is higher than the temperature T1. A transistor TR6 in the voltage detecting circuit 1007 is turned off when the ambient temperature is higher than the temperature To in FIG. 10 and turned on when the ambient temperature is lower than the temperature To.

(I) When the ambient temperature is normal, that is, within the range between the temperature To and the temperature T1 in FIG. 10, the collector current of the transistor TR5 tends to decrease under the influence of the negative characteristic thermistor TH as the ambient temperature rises. Consequently, the collector current of the transistor TR4 in the control circuit 1005 decreases as the ambient temperature rises while the collector current of the transistors TR3, TR2 and TR1 increases with the rise of the ambient temperature. When the ambient temperature is normal, therefore, the output voltage of the input voltage control circuit 700, that is, the input voltage of the inverter 66 has a characteristic as shown by the line C1 in FIG. 10.

(II) When the ambient temperature is higher than the temperature T1 shown in FIG. 10, the resistance value of the negative characteristic thermistor TH is so small that the terminal voltage of the resistor R2 exceeds the zener voltage of the zener diode ZD2, thus turning on the zener diode ZD2. Thus, the voltage between the base and emitter of the transistor TR5 is maintained at a predetermined level by the zener diodes ZD1 and ZD2. In other words, the collector current of the transistor TR5 is maintained at a predetermined level, with the consequence that the collector current of the transistor TR1 is also maintained at a predetermined level. When the ambient temperature is high, therefore, the input voltage of the inverter 66 has a characteristic shown by the line C3 in FIG. 10.

(III) When the ambient temperature is lower than the temperature To in FIG. 10, the resistance value of the negative characteristic thermistor TH is so large that the collector current of the transistor TR1 becomes extremely low. This causes the potential at point X in the figure of the voltage detecting circuit 1007 to increase and the potential at point Y to increase, switching the transistor TR6 from the OFF state to the ON state. As soon as the transistor TR6 is turned on, the transistor TR4 in the control circuit 1005 is completely turned on, thus turning off the transistors TR3 and TR2, with the consequence that the transistor TR1 is turned off. Consequently, when the ambient temperature is low, the input voltage of the inverter 66 has a characteristic shown by the line C2 in FIG. 10. Upon turning off the transistor TR1, a voltage is instantaneously generated in the resistor R5 of the OFF-state detecting circuit 1008, bringing the thyristor PUT temporarily to the ON state at a predetermined cycle in accordance with the time constant of the circuit including the capacitor C. As long as the thyristor PUT is in the ON state, the transistor TR7 of the reset circuit 1009 remains turned on, and the transistor TR6 is short-circuited and turned off. Consequently, the transistor TR4 of the control circuit 1005 is turned off, with the result that the transistor TR1 is turned on. When the transistor TR1 is turned on, current flows in the series circuit of the resistor R2 and the negative characteristic thermistor TH. In this state, when the ambient temperature is higher than the temperature To shown in FIG. 10, the transistor TR5 is conducting, and the conduction of the transistor TR5 determines the conduction of the transistor TR1. On the other hand, when the ambient temperature remains lower than the temperature To, the transistor TR6 is turned on again and the transistor TR1 is turned off again. And, similarly to the above description, when the transistor TR1 is turned off, the transistor TR6 is turned off by a voltage produced in the resistor R5. Then, the transistor TR4 is turned off and the transistor TR1 is turned on, causing current to flow in the negative characteristic thermistor TH. That is, the ambient temperature is periodically checked. In other words, when the ambient temperature at the moment when current flows in the negative characteristic thermistor TH is higher than the temperature To, the transistor TR1 is conducting to supply electric power to the inverter 66. On the other hand, when the ambient temperature remains lower than the temperature To, the transistor TR1 is turned off. Thereafter, the same operation is repeated. In other words, when the ambient temperature is low, the supply of electric power to the inverter 66 is discontinued, and the ambient temperature is detected at a predetermined cycle. When the ambient temperature is restored to normal, the supply of electric power to the inverter 66 is resumed. On the other hand, when the ambient temperature remains low, the supply of electric power to the inverter 66 remains discontinued.

Figure 12:
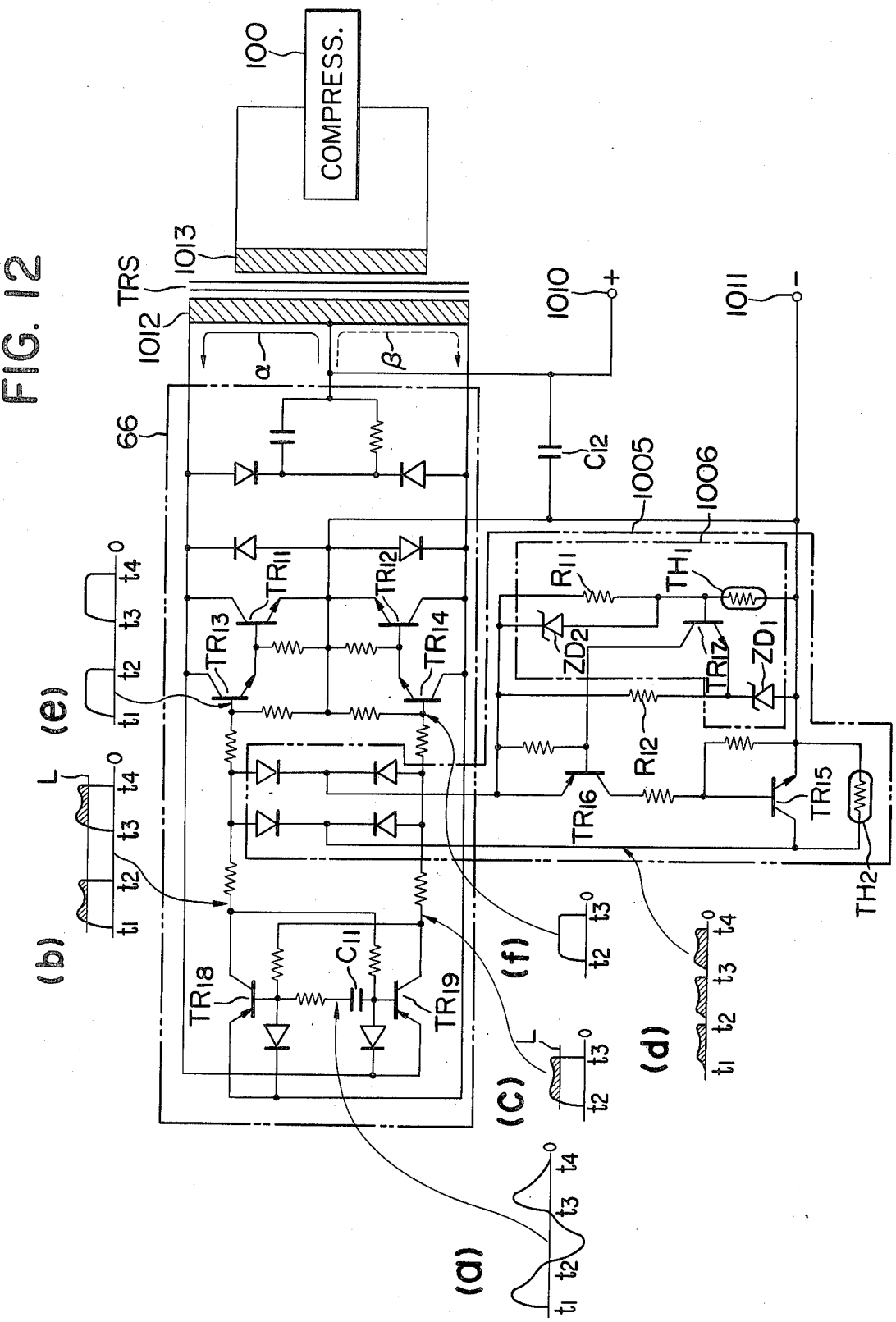
FIG. 12 is a circuit diagram of another embodiment of the invention for controlling the refrigerating system in accordance with the characteristics shown in FIG. 10.

FIG. 12 shows still another embodiment of the input voltage control circuit controlling the voltage in accordance with the characteristic shown in FIG. 10. This device is designed to decrease the output of the inverter 66 in accordance with the ambient temperature of the refrigerating system by directly controlling the inverter 66 itself. In the figure, numeral 100 refers to an electrical vibration type compressor; 66 to the inverter; 1005 to a control circuit; 1006 to a temperature detecting circuit; 1010 and 1011 to terminals of the d-c power source; 1012 to a winding on the output terminal side of the inverter; 1013 to a secondary winding; symbol TRS to a transformer; TR11 and TR12 to semiconductor elements with control portions which are alternately turned on and off, for example, transistors; TR13 and TR14 to transistors Darlington-connected to the transistors TR11 and TR12, respectively; TR15 to a main switching element used in this invention, for example, a transistor; TR16 to a transistor for controlling the base current of the transistor TR15; TR17 to a transistor for controlling the base current of the transistor TR16; TR18 and TR19 to transistors for supplying base currents to the transistors TR13 and TR14; C11 to a capacitor for determining the switching cycle of the transistors TR11 and TR12; C12 to a smoothing capacitor for smoothing the power source voltage; TH1 to a first thermistor having such a characteristic that its resistance increases with a drop in ambient temperature; TH2 to a second thermister having such a characteristic that its resistance becomes almost zero when the ambient temperature is lower than the temperature To shown in FIG. 10; ZD1 to a zener diode; ZD2 to a zener diode which is brought to the ON state when the ambient temperature is higher than the temperature T1 shown in FIG. 10; R11 and R12 to resistors, respectively.

In the inverter 66, the transistors TR11, TR13 and TR18, and the transistors TR12, TR14 and TR19 are alternately and repeatedly turned on and off. When the transistors TR11, TR13 and TR18 are in the ON state and the transistors TR12, TR14 and TR19 are in the OFF state, current $\alpha$ is supplied to the inverter output terminal side winding 1012, as shown by the solid line in the figure. On the other hand, when the transistors TR11, TR13 and TR18 are in the OFF state and the transistors TR12, TR14 and TR19 are in the ON state, current $\beta$ is fed to the inverter output terminal side winding 1012, as shown by the broken line in the figure. In this way, by alternately supplying the current $\alpha$ shown by the solid line in the figure and the current $\beta$ shown by the broken line to the inerter output terminal side winding 1012, an a-c voltage is produced in the secondary winding 1013 through the transformer TRS to operate the compressor 100. The switching operation of the transistors TR11, TR13 and TR18 and the transistors TR12, TR14 and TR19 is performed in accordance with the charge and discharge current waveform of the capacitor C11 as shown by the waveform (a) in the figure. The level of the current $\alpha$, that is, the current to the transistor TR11 is proportional to the base current of the transistor TR13, that is, the control current. While the level of the current $\beta$, that is, the current to the transistor TR12 is proportional to the base current of the transistor TR14, that is, the control current. The abovementioned operation of the inverter 66 may be considered to correspond to that of the inverter shown in FIG. 5, in which the transistors 39 and 40 are removed and the transformer TRS is used.

The control circuit 1005 determines the level of the control current in accordance with the ambient temperature. That is, (IV) when the ambient temperature is normal, or within a range between the temperatures T0 and T1 shown in FIG. 10, the control current level is decreased (or increased) with a drop (or a rise) in ambient temperature to decrease (or increase) the output level of the inverter 66. (V) When the ambient temperature is low, or lower than the temperature To, the control current level becomes zero, reducing the output level of the inverter to zero. (VI) When the ambient temperature is high, or higher than the temperature T1, the control current level is maintained at a predetermined level to keep the output level of the inverter 66 constant. In the state (V) above, when the ambient temperature is restored to normal, the output level of the inverter 66 is automatically restored to normal. In the following, the operation of the control circuit 1005 will be described. (IV) When the ambient temperature is normal, current proportional to the collector currents of the transistors TR18 and TR19 represented by the waveforms (b) and (c) in the figure flows in the series circuit consisting of the resistor R11 and the first thermistor TH1. As long as the terminal voltage of the first thermistor TH1 exceeds the zener voltage of the zener diode ZD1, the transistor TR17 remains conducting, the collector current of which is determined in proportion to the terminal voltage of the first thermistor TR1. That is, the collector current of the transistor TR17 corresponds to the shaded portions in the waveforms (b) and (c) in the figure. The current level L in the waveforms (b) and (c) in the figure is determined by the resistance of the first thermistor TH1, that is, the current level L is decreased (or increased) with an increase (or a decrease) in the resistance of the thermistor TH1. The collector current of the transistor TR16 is proportional to the collector current of the transistor TR17, and the collector current of the transistor TR15 is proportional to the collector current of the transistor TR16. Consequently, the collector current waveform of the transistor TR15 is as shown by the waveform (d) in the figure. As a result, the base currents, or the control currents of the transistors TR13 and TR14 are as shown by the waveforms (e) and (f) in the figure. In this way, when the ambient temperature is normal, the control circuit 1005 causes the control current level to increase (or decrease) with a rise (or a drop) in ambient temperature. That is, the output level of the inverter 66 increases (or a drop) in ambient temperature. (V) When the ambient temperature is low, the resistance of the second thermistor TH2 is substantially decreased, bypassing the collector currents of the transistors TR18 and TR19 to the control circuit 1005. This prevents base currents, or control currents, to flow in the transistors TR13 and TR14, bringing the output level of the inverter 66 to zero. When the ambient temperature is restored to normal, or increased from the level lower than To to the level higher than To, the resistance of the second thermistor TH2 increases to cause the control circuit 1005 to resume the operation (IV) above. Thus, the output level of the inverter 66 is restored to normal. (VI) When the ambient temperature is high, the resistance of the first thermistor TH1 is decreased, thus turning on the zener diode ZD2, maintaining the collector currents of the transistors TR17, TR16 and TR15 at a predetermined level, and maintaining the base currents of the transistors TR13 and TR14 at a predetermined level. Consequently, the output level of the inverter 66 is maintained at a predetermined level.

In this way, the system shown in FIG. 12 causes the output level of the inverter 66 to decrease as the ambient temperature of the refrigerating system lowers.

As have been described on several embodiments above, this invention makes it possible to prevent unwanted damage to valve chests, when the refrigerating system is operated at low ambient temperature, by discontinuing the supply of electric power to the compressor, and to prevent the burning of the windings due to temperature rise, when the refrigerating system is operated at high ambient temperature, by maintaining the supply of electric power to the compressor at a predetermined level. Furthermore, when the refrigerating system is operated at low ambient temperature, this invention makes it possible to automatically resume the supply of electric power to the compressor when the ambient temperature is restored to normal.

Although this invention has been described in connection with the particular embodiments, it will be appreciated that the invention is not specifically limited thereto, but may be modified and varied without departing from the spirit and the scope of this invention.

What is claimed:

1. A refrigerating system having an electrical vibration type compressor powered by electric energy, a condenser to which refrigerant delivered by the compressor is fed, a capillary tube provided on the downstream side of the condenser, and an evaporator provided on the downstream side of the capillary tube, wherein electric energy to be supplied to the compressor is controlled in accordance with the ambient temperature of the refrigerating system to reduce the piston stroke of the compressor so that the compression level of the refrigerant is lowered in accordance with a drop in the ambient temperature.

2. A refrigerating system as set forth in claim 1 wherein the electrical vibration type compressor is constructed so that the natural vibration frequency of a mechanical vibration system designed taking into consideration the coefficient of elasticity of the refrigerant is maintained in resonance or in the neighborhood of resonance with the vibration frequency of an electrical vibration system to be fed to the electrical vibration type compressor.

3. A refrigerating system as set forth in claim 2 wherein the electrical vibration type compressor is constructed so that electric energy is supplied by an inverter producing alternating voltage, the inverter being constructed so as to change the vibration frequency of the alternating voltage in accordance with changes in the natural vibration frequency of the mechanical vibration system of the electrical vibration type compressor.

4. A refrigerating system as set forth in claim 3 wherein the inverter has an input voltage control circuit on the input side, the input voltage control circuit being constructed so that the output voltage level is changed in accordance with the ambient temperature of the refrigerating system.

5. A refrigerating system as set forth in claim 4 wherein the input voltage control circuit has switching elements connected in series with the current supply circuit of the inverter, and a control circuit stage for controlling the switching elements, the control circuit stage having in the input stage thermistors whose resistances change with the ambient temperature of the refrigerating system.

6. A refrigerating system as set forth in claim 5 wherein a plurality of the thermistors are provided, the first thermistor performing control function in accordance with the ambient temperature of the refrigerating system, the second thermistor forcibly maintaining the switching elements in the OFF state.

7. A refrigerating system as set forth in claim 5 or 6 wherein the switching elements are constructed of transistors, the emitters of the transistors being disposed on the side of the power source.

8. A refrigerating system as set forth in claim 4 wherein the input voltage control circuit is constructed so that the input voltage level of the inverter is increased and decreased in accordance with a rise and a drop in the ambient temperature of the refrigerating system when the ambient temperature exceeds a predetermined temperature level and is kept at zero level during the period when the ambient temperature is below the predetermined temperature level, and so that the ambient temperature is detected at a predetermined frequency during the period when the ambient temperature is below the predetermined temperature level, and the supply of electric power to the inverter is automatically resumed when the ambient temperature exceeds the predetermined temperature level.

9. A refrigerating system as set forth in claim 8 wherein the input voltage control circuit has switching elements connected in series with the power supply circuit of the i inverter, a control circuit for controlling the switching elements, thermistors whose resistances change with the ambient temperature of the refrigerating system, a temperature detecting circuit for controlling the control circuit, a voltage detecting circuit for detecting the input voltage level of the inverter to control the control circuit based on the results of detection, an OFF state detecting circuit for detecting the switchover of the switching elements to the OFF state, and a reset circuit for resetting the turned-off switching elements by controlling the voltage detecting circuit based on the output signal of the OFF state detecting circuit.

10. A refrigerating system as set forth in claim 3 wherein the inverter has at least two semiconductor elements with control portions, which are alternately turned on and off, and is constructed so that d-c power is converted into a-c power to supply to the electrical vibration type compressor and the output current level is determined in accordance with the control current level supplied to the control portions of the semiconductor elements with control portions, and a control circuit for determining the control current level in accordance with the ambient temperature of the refrigerating system is provided and constructed so as to reduce the control current level with a drop in the ambient temperature.

11. A refrigerating system as set forth in claim 10 wherein the control circuit is constructed so that the control current level is maintained at zero level when the ambient temperature is below a predetermined temperature level.

12. A refrigerating system as set forth in claim 11 wherein the control circuit is constructed so that the supply of the control current is automatically resumed when the ambient temperature is restored above the predetermined temperature level.

13. A refrigerating system as set forth in claim 12 wherein the control circuit has a temperature detecting portion having a first thermistor whose electrical resistance varies with the ambient temperature, a main switching element for determining the control current level by bypassing a current having a level corresponding to the detected signal of the temperature detecting portion, and a second thermistor for shortcircuiting the main switching element when the ambient temperature is below the predetermined temperature level.

* * * * *